(No Model.)
J. H. FRENCH.
BEE HIVE.
No. 281,483. Patented July 17, 1883.
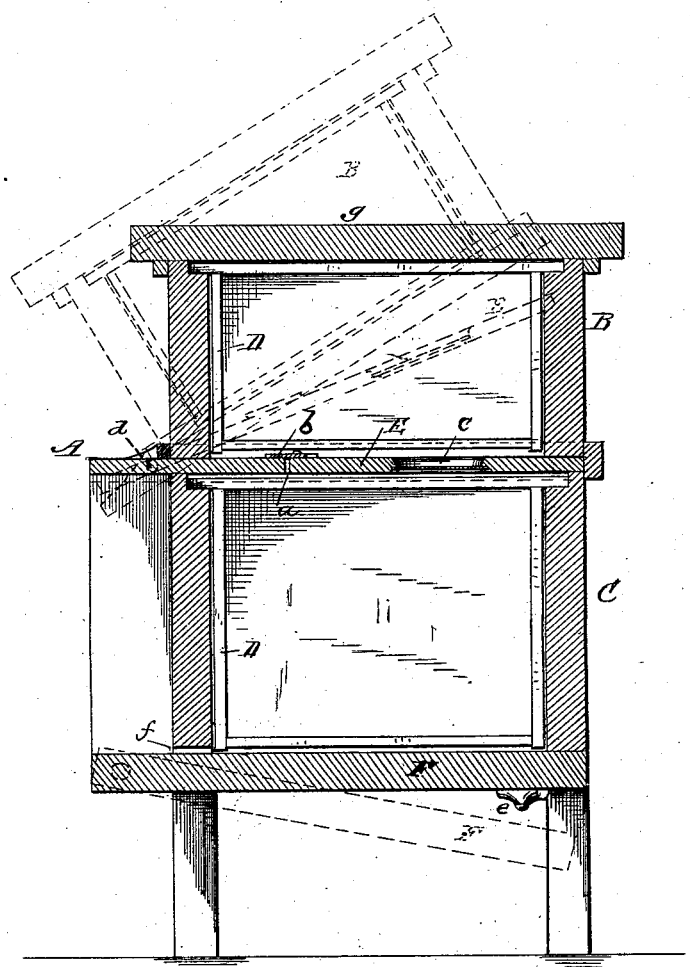
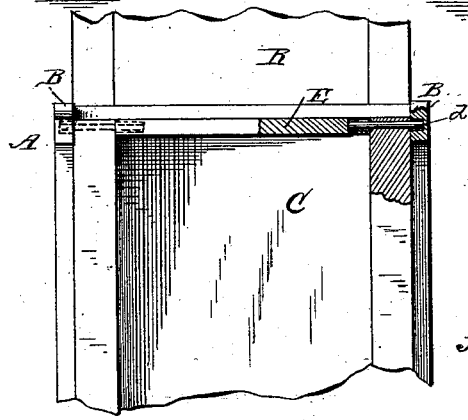
WITNESSES
F. L. Ourand
N. E. Oliphant
INVENTOR
James H. French,
per Chas. H. Foster,
Attorney

UNITED STATES PATENT OFFICE.

JAMES H. FRENCH, OF ELIZABETHTOWN, KENTUCKY.

BEE-HIVE.

SPECIFICATION forming part of Letters Patent No. 281,483, dated July 17, 1883.

Application filed March 16, 1883. (No model.)

*To all whom it may concern:*

Be it known that I, JAMES H. FRENCH, a citizen of the United States, residing at Elizabethtown, in the county of Hardin and State of Kentucky, have invented certain new and useful Improvements in Bee-Hives; and I do hereby declare that the following is a full, clear, and exact description of the same, reference being had to the annexed drawings, making a part of this specification, and to the letters and figures of reference marked thereon.

Figure 1 of the drawings is a longitudinal vertical section of my invention; and Fig. 2 is a detail view of the rear or back portion of the hive, partly in section, to show the manner of hinging the upper compartment and division-board to the lower compartment.

The present invention has relation to that class of bee-hives composed of two compartments hinged together, the lower one having a drop-bottom; and the object thereof is to improve the construction, whereby access to the hive is rendered much easier when required to remove the honey, or for otherwise working it without disturbing or irritating the bees, and one also adapted to readily and quickly serve for hiving the bees when swarming. These objects I attain by the construction substantially as shown in the accompanying drawings, and hereinafter described.

In the drawings, A represents the bee-hive, provided with two compartments, B C, having hung therein the ordinary comb-frames, D, a division-board, E, being located between the two compartments, said board being provided with an opening, *a*, for the passage of the bees, this opening having a suitable cover, *b*, which may be closed at will, a glass panel, *c*, being also formed in this division-board. The compartment B is provided with a removable top, *g*, and is connected to the compartment C by means of pivot *d*, passing through the sides thereof, and extending into the division-board E, as shown in Fig. 2, said pivots being entirely concealed and protected by the material composing the hive, thereby preventing them from becoming rusted and worthless, as is too frequently the case with metal hinges commonly used for connecting the compartments of bee-hives. The compartment C is provided with a drop-bottom, F, also hung upon concealed pivots and secured in place by buttons *e*, an opening, *f*, being made in the lower front portion of this compartment for the passage of the bees.

It will be seen by reference to Fig. 1 that the upper compartment and division-board, working on the same pivots, may be swung up, as indicated by dotted lines, and to admit light through the hive the pivoted bottom of the lower compartment is dropped, as also indicated by dotted lines, the hive being handled from the rear or opposite to the entrance for the bees, thus giving free access at any time without interfering with or irritating the bees.

The drop-bottom is also found very useful when the bees are swarming, as when said bottom is down the bees readily enter and are hived by simply securing this bottom in place when the swarm have thus entered, it being very difficult to induce the bees when swarming to enter the hive through the regular entrance.

Having now fully described my invention, what I claim as new, and desire to secure by Letters Patent, is—

The combination, with the compartment C, having opening *f*, and the drop-bottom F, of the compartment B and the division-board E, having glass panel *c* and opening *a*, with cover *b*, said compartment and division-board being pivotally connected to the compartment C, substantially as and for the purpose set forth.

In testimony that I claim the above I have hereunto subscribed my name in the presence of two witnesses.

JAMES H. FRENCH.

Witnesses:
SAML. GOLDNOMER,
M. B. SHOWERS.